May 8, 1962 W. R. MILLER 3,033,315
FLUID PROPORTIONING DEVICE
Filed Aug. 26, 1958 4 Sheets-Sheet 2
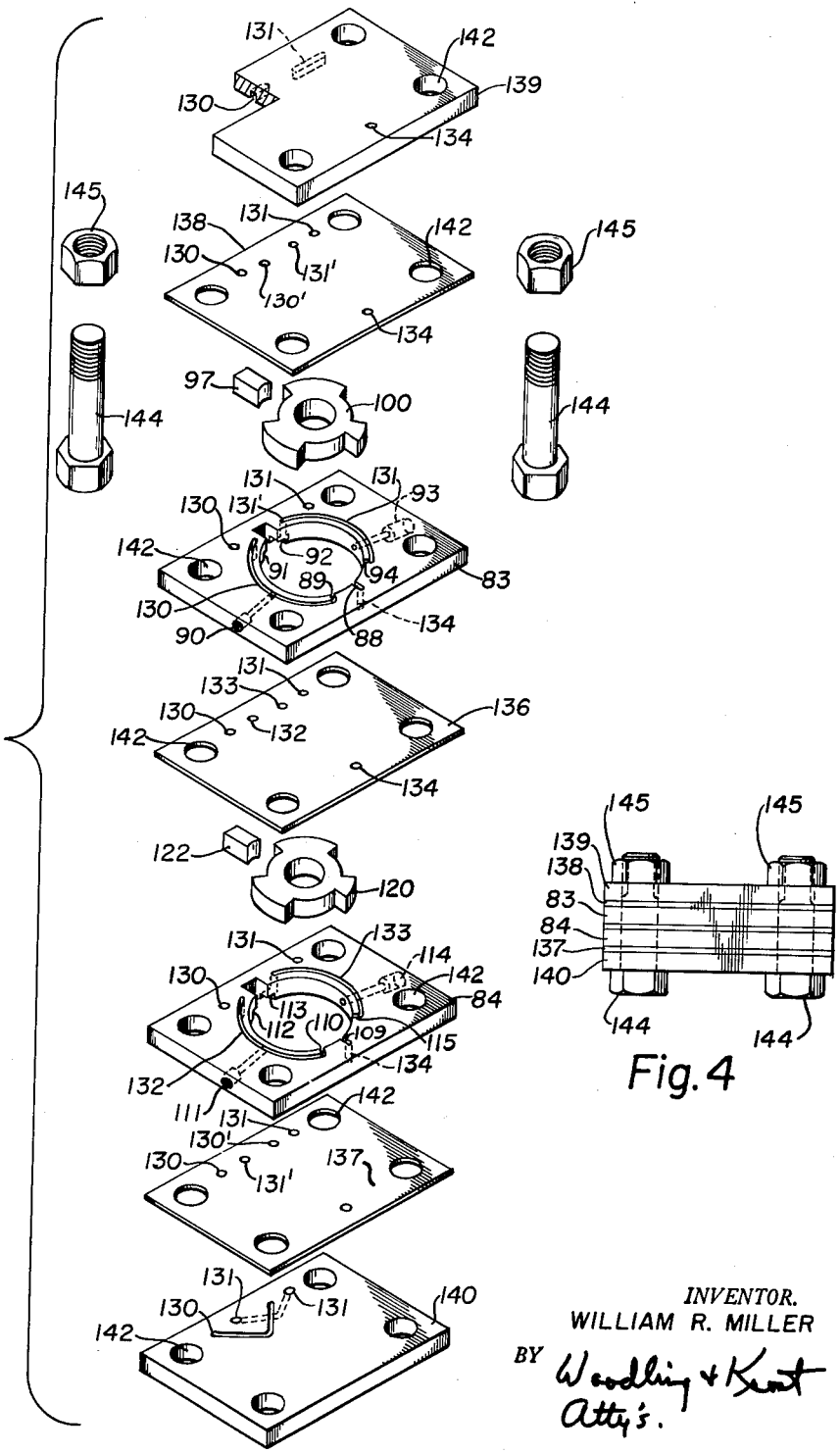
INVENTOR.
WILLIAM R. MILLER
BY Woodling & Kent
Atty's.

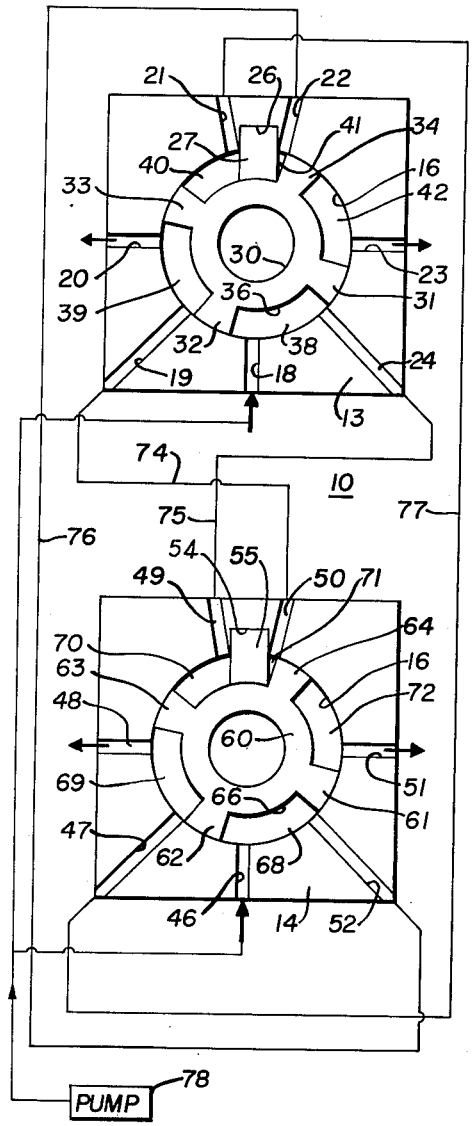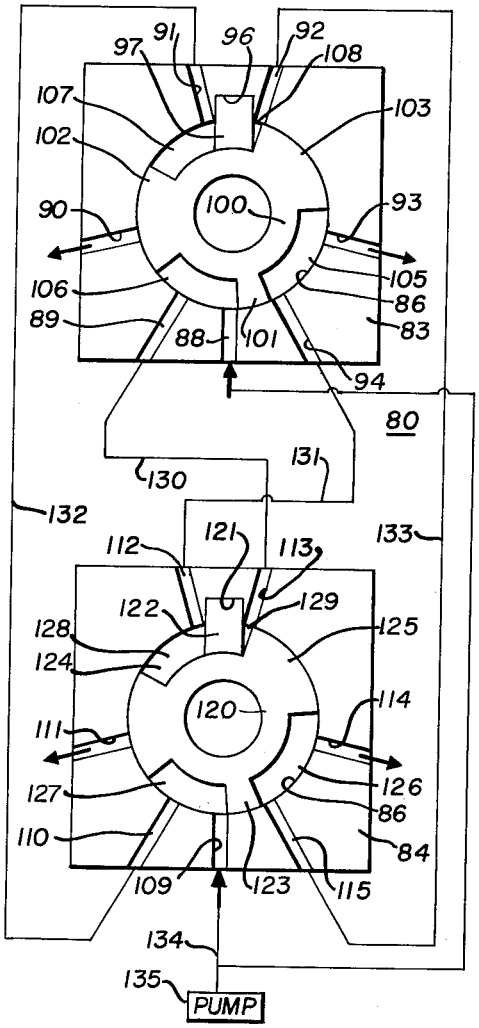

May 8, 1962 W. R. MILLER 3,033,315
FLUID PROPORTIONING DEVICE
Filed Aug. 26, 1958 4 Sheets-Sheet 3
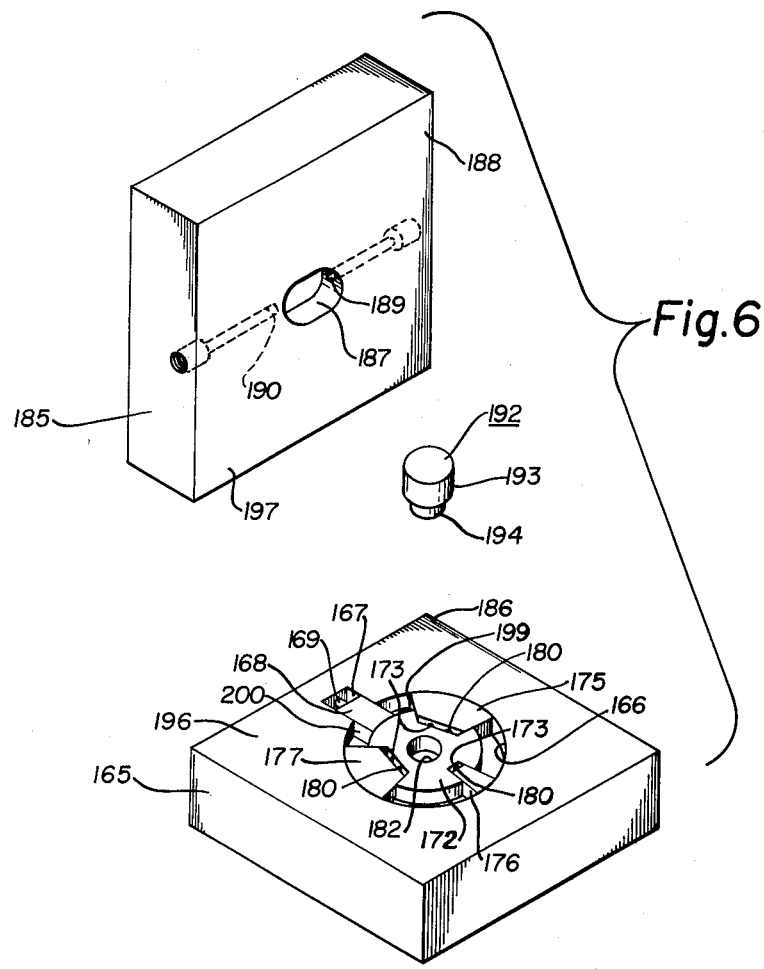
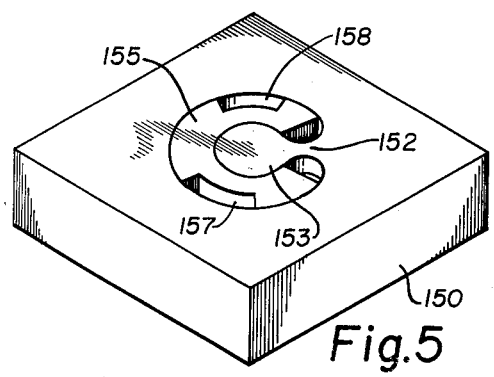
Fig.6
Fig.5
INVENTOR.
WILLIAM R. MILLER
BY Woodling & Krost
Attys.

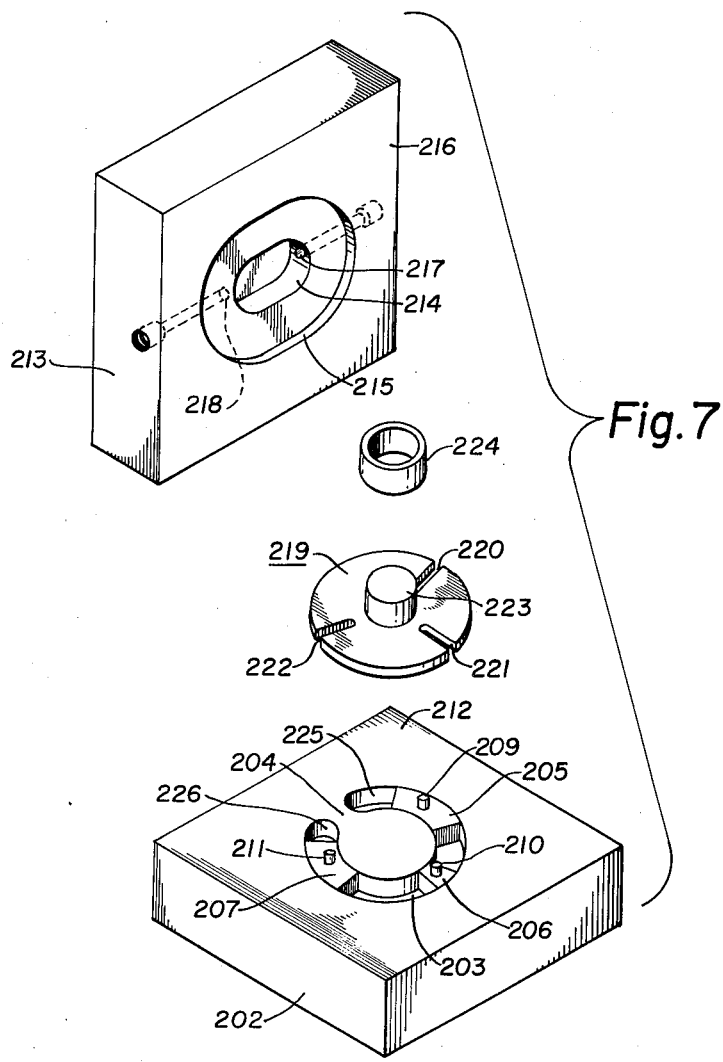

United States Patent Office 3,033,315
Patented May 8, 1962

3,033,315
FLUID PROPORTIONING DEVICE
William R. Miller, 1289 Genesee St., Cleveland 24, Ohio, assignor of forty-five percent to Charles R. Rust and ten percent to Donald D. Miller
Filed Aug. 26, 1958, Ser. No. 757,384
9 Claims. (Cl. 184—7)

The invention relates in general to devices for proportioning the flow of a material and causing the same to be directed to different places and in particular the invention relates to a feeder device for use in a centralized lubrication system to proportion a lubricant and cause the same to be directed to a plurality of areas to be lubricated.

An object of the invention is to provide a proportioning device wherein a rotor having segments thereon, turns within a bore in a block which is appropriately ported whereby proportioned material is delivered to predetermined places.

Another object of the invention is to provide a proportioning device which includes at least first and second rotors turnable in first and second separated cylinders which are appropriately ported whereby material is delivered to a plurality of places.

Another object of the invention is to provide a proportioning device which includes block means with groove means having segments located therein and secured a fixed distance from each other and appropriate porting to chambers formed between the segments whereby material may be proportioned to different places.

Another object of the invention is to provide a porportioning device having adjustment means whereby the amount of material delivered may be readily varied.

Other objects and a fuller understanding of this invention may be had by referring to the following description and claims, taken in conjunction with the accompanying drawings, in which:

FIGURE 1 is a schematic representation of the teachings of the present invention showing a fluid proportioning device constructed with a four segment rotor;

FIGURE 2 is a schematic representation similar to that shown in FIGURE 1 but illustrating how the teachings of the present invention may be incorporated into a three segment rotor;

FIGURE 3 is a exploded isometric view of the parts which make up an embodiment of the fluid proportioning device shown schematically in FIGURE 2 which includes a three segment rotor;

FIGURE 4 is a side elevational view of the device shown in FIGURE 3 in its assembled condition;

FIGURE 5 illustrates a modification which may be made under the teachings of the present invention in the rotor construction and in the intermediate section or block within which the rotor is adapted to reside;

FIGURE 6 is an isometric view made in accordance with the teachings of the present invention, showing how the intermediate section or block and rotor construction may be manufactured whereby the volume of fluid or lubricant in the case of the centralized lubricating system can be adjusted; and FIGURE 7 is a construction for accomplishing the purposes of the structure of FIGURE 6.

Referring now to FIGURE 1, the proportioning device has been illustrated as a feeder for a centralized lubricating system and has been indicated generally by the reference numeral 10. The feeder shown in this figure includes generally block means which comprises in this figure first and second blocks 13 and 14 which may also be referred to as intermediate sections or blocks. Each of the block members 13 and 14 are provided with a bore 16. Block member 13 has been provided with seven ports indicated by the reference numerals 18—24. The block members 13 is also provided with a generally rectangular shaped groove 26 which holds a stop or an abutment member 27. The stop member 27 is secured by the groove 26 and extends outwardly into the bore 16 of block member 13. Fitted in the bore 16 of block member 13 is a rotor 30 with four segments 31—34 integrally formed therewith. The wall of the bore 16 may be referred to as an outer wall and the wall 36 of the rotor 30 may be referred to as an inner wall. These two walls may be said to define a circular slot. The structure hereinabove recited of the block member 13, the rotor 30, which includes the segments, and the stop member serve to define five chambers indicated by the reference numerals 38—42. The construction of the second block member which is included in the feeder 10 of FIGURE 1 is constructed essentially the same as block member 13. The ports in block member 14 corresponding with those in 13 have been indicated by the reference numerals 46—52 and the groove and stop member in block 14 have been indicated by the reference numerals 54 and 55, respectively. The rotor is indicated by the reference numeral 60 and the segments by the reference numerals 61—64. The outer wall of the rotor 60 has been indicated by the reference numeral 66 and the chambers in the second block member are indicated by the reference numerals 68—72.

A plurality of conduits or conduit means have been provided for obtaining fluid connection between the ports of the first and second block members 13 and 14, respectively. Conduit means 74 provides communication between ports 19 and 50, conduit means 75 provides communication between ports 24 and 49, conduit means 76 provides communication between ports 22 and 52, and conduit means 77 provides communication between ports 21 and 47. Ports 20 and 23 in block member 13 and ports 48 and 51 in block member 14 lead to devices to be lubricated which may, for the sake of example, be four different bearings on a machine or to similar block members as shown. Port 18 on block 13 and port 46 on block member 14 are fluid inlets and provide for the entrance of a lubricant from a source such as a pump 78 into the feeder 10.

In operation, assume that the rotors 30 and 60 are in the position shown in FIGURE 1. In this position fluid from a supply source may gain entrance to the feeder through ports 46 and 18 which are a common line. The entrance of fluid through port 46 causes the same to travel through chamber 68, port 52 and conduit means 76 into port 22 of block 13 and in turn into chamber 41. This exerts a force on segment 34 of rotor 30 causing the rotor to turn in a clockwise direction which causes the fluid to be forced out of chamber 40 and port 21 through conduit means 77 and into chamber 69 of block 14 through port 47. The fluid passes from chamber 69 through the outlet port 48 to one of the aforementioned devices to be lubricated, in this instance a bearing. With the rotors in the starting position, as described hereinabove, the fluid which gained entrance to chamber 38 in block 13 through port 18 and from there through port 24, conduit means 75 into chamber 70 of block 14 would cause no movement in the counterclockwise direction of rotor 60 because segment 64 has reached the limit of its counter-clockwise travel and abuts the stop member 54. Rotor 30 with its segment 33 engaging the stop member 27 permits fluid flow through port 18, chamber 38, port 19, through conduit means 74 and into chamber 71 of block 14 through port 50. This causes rotor 60 to rotate in a clockwise direction which causes lubricant to be forced from chamber 70. Fluid from chamber 70 passes through port 49 through conduit means 75 into chamber 42 through port 24. From chamber 42 the fluid travels through outlet port 23 to its associated bearing. After this, both rotors 30 and 60 are in their furthest clockwise travel. In this position, fluid entering block 14 through port 46 travels through chamber 68, port 47, conduit means 77 and into chamber 40 through port 21. This causes rotor 30 to travel in a counter-clockwise direction. This travel causes lubricant to be forced from chamber 41 through port 22, conduit means 76 and into chamber 72 through port 52. From here it travels through outlet port 51 to an associated bearing. Next, fluid enters chamber 38 of block 13 through port 18. From there it travels through port 24, through conduit means 75 and into chamber 70 through port 49. This causes rotor 60 to rotate in a counter-clockwise direction. This rotation causes fluid to be forced from chamber 71 through port 50, conduit means 74 and into chamber 39 through port 19. From there fluid travels through outlet port 20 to an associated bearing. The rotors after these four movements have taken place, are in their starting position and the cycle is in condition to be repeated.

FIGURE 2 is a construction similar to that shown in FIGURE 1 except that the rotor is constructed with three segments and the porting differs somewhat. The feeder of FIGURE 2 has been indicated generally by the reference numeral 80 and includes first and second block members 83 and 84, respectively. Each of the block members is provided with a bore 86, block member 83 is provided with ports 88—94, and the block also has a generally rectangular shaped groove 96 into which is fitted a stop or abutment member 97. A rotor 100 is fitted in the bore 86 of block 83 and is provided with three segments 101—103. Chambers 105 through 108 are formed in block member 83 by this construction. Block member 84 has ports 109—115 and a rotor 120. The block 84 has a groove 121 and a stop or abutment member 122. The rotor 120 has segments 123, 124 and 125 and this construction forms chambers 126, 127, 128 and 129. Conduit means extend between the two block members 83 and 84 to provide fluid connection between appropriate ports thereof. Conduit means 130 provides fluid connection between ports 89 and 113, conduit means 131 provides fluid connection between ports 94 and 112, conduit means 132 provides connection between ports 91 and 110 and fluid conduit means 133 provides fluid connection between ports 92 and 115. A common conduit 134 provides fluid entrance to ports 88 and 109 from a pump 135.

In operation, the device shown in FIGURE 2 functions substantially the same as the device shown in FIGURE 1. For example, with the rotors in the position shown in the full line drawing of FIGURE 2, fluid enters chamber 106 through inlet port 88 and from there through port 89, conduit means 130, port 113 and into chamber 129. This causes a force to be exerted against segment 125 of rotor 120 which causes it to move in a clockwise direction. This movement causes fluid to be expelled from chamber 128 through port 112, conduit means 131 and into chamber 105 through port 94. From here it travels through outlet port 93 to an associated bearing. Next, lubricant enters inlet 109 in block 84 and with rotor 120 in its most clockwise position travels by way of conduit means 133 to chamber 108. This causes rotor 100 to move in a clockwise direction and expels fluid from chamber 107 through conduit means 132 to an associated bearing through outlet port 111. With the rotors in their most clockwise position of travel, fluid from inlet port 88 by way of conduit means 131 causes rotor 120 to move in a counter-clockwise direction to expel fluid from chamber 129. From chamber 129 fluid passes through outlet 90 to an associated bearing. Next, fluid travels into chamber 127 through inlet port 109 and from there by way of conduit means 132 into chamber 107. This causes rotor 100 to turn in a counter-clockwise direction expelling fluid from chamber 108 through port 92. This expelled fluid travels by way of conduit means 133 to chamber 126 and thence through outlet ports 114 to another device to be lubricated.

FIGURE 3 is an exploded isometric view of a commercial device constructed in accordance with the teachings of the present invention and showing the actual structure for accomplishing the function described by the schematic illustration of FIGURE 2. The same reference numerals will be applied to FIGURE 3 as were applied to FIGURE 2 wherever appropriate, however, different reference numerals will be applied wherever new structure results. The device shown in FIGURE 3 includes the first and second block members 83 and 84. In addition to this the block members 83 and 84 are separated by a spacer plate 136, and top and bottom sections or blocks 139 and 140, respectively, have been provided. Interposed between block 84 and bottom section 140 is a spacer plate 137 similar to plate 136. Although not absolutely necessary in the operation of the device another spacer plate 138 is interposed between block 83 and the top section 139. The use of this plate prevents possible error in assembly. Each of the seven members, 83, 84, 136, 137, 138, 139, and 140 are provided with four holes 142 and through these holes bolts 144 are adapted to extend and which are secured in position by nuts 145. A side elevational view is shown in FIGURE 4 showing the seven members secured in assembled position by the bolts 144 and nuts 145. The spacer plate 136 serves the purpose of keeping as separate units the chambers of the block members 83 and 84, respectively. The operation of the device is the same as that of FIGURE 2. For example, fluid enters the device through the common conduit 134 which includes the holes 134 in the top section 139, in the spacer 138, in the block 83, in spacer 136 and in block 84. Fluid enters chamber 106 through port 88 in block 83. From there it travels out port 89 into conduit means 130 which includes a groove on the upper surface of block 83, upwardly through opening 130' in spacer 138 into slot 130 in top section 139 and then down through holes 130 in spacer 138, block 83, spacer 136, block 84 and into groove 130 on the bottom section 140. From here it travels up through hole 130' in spacer 137 into chamber 129 through port 113. This causes rotation of rotor 120 which expels fluid from chamber 128 through port 112 into conduit means 131 which includes the angle drilled hole 131 in bottom section 140 and the hole 131 in spacer 137. From here the fluid travels upwardly through opening 131 in spacer 137, block 84, spacer 136, block 83, spacer 138 into slot 131 in the top section 139. From here it travels down through opening 131' in spacer 138 into the slot 131' in block 83. From here it goes into chamber 105 through port 94 and exits block 83 through port 93. The remaining sequence is as described in the operation of FIGURE 2.

FIGURE 5 is an isometric view illustrating how the construction of the intermediate block members 83 and 84 may be varied. In this construction, the block member is indicated by the reference numeral 150 and in this construction a slot is machined leaving a stop member 152 which is integral with the block member. With this means of construction, the central pivot 153 is in turn an integral part of the block 150 through stop member 152. The rotor 155 is provided with an inner wall which surrounds the central pivot 153 and turns thereon. Notches 157 and 158 are provided in the rotor 155 and form the chambers which are necessary as described hereinabove. This figure only serves to illustrate that the block and rotor construction can be varied without departing from the teachings of the present invention and no porting or other construction has been associated with the block member of FIGURE 5.

It will be readily appreciated from the discussion and description of the devices of FIGURES 1–5 that the amount of lubricant supplied to a device to be lubricated, for example, bearings discussed, is dependent upon the volume of the chamber next to or adjacent either side of the stop member, for example, chambers 107, 108, 128 and 129 of FIGURE 2. The volume of lubricant can be altered by replacing the rotor by one which has a smaller or larger volume built in. The devices illustrated in FIGURES 6 and 7 provide a construction wherein the volume from the various outlets may be varied within a reasonable range, without replacing any of the parts. For example, in FIGURE 6 a three segment rotor has been shown which is similar to that shown in FIGURES 2 and 3 but with the addition of the adjustable feature. The porting in the case of the device of FIGURE 6 would be substantially the same as that shown in FIGURES 2 and 3. The device in FIGURE 6 includes a block member 165 having a bore therein 166. The block member is also provided with a groove 167 which is generally rectangular in configuration and in this groove resides a stop member 168 which extends out into the bore 166. An adjusting screw 169 is provided for a purpose which will be described hereinafter. Located in the bore 166 is a rotor 172 which is provided with tapering slots 173. Segments 175—177 are provided each of which has a portion which resides in one of the respective slots 173 and which has another portion which slidably fits against the wall of the bore 166. Springs 180 are located in each of the slots 173 and urge the respective segments outwardly against the bore wall 166. The rotor 172 is provided with a central opening 182. An associated block member 185 is provided and houses the means for varying the output of the device. The block member 185 is provided with an elongated slot 187 and first and second openings 189 and 190 communicate with the respective ends of the slot. The openings 189 and 190 are each adapted to receive an adjustment screw. A pivot member 192 is provided and includes first and second portions 193 and 194, respectively. The second portion 194 is adapted to reside within the central opening 182 of the rotor 172 in the assembled condition of the blocks 165 and 185. In the assembled condition of the two blocks, surface 186 on block 165 engages surface 188 on block 185 and adjusting screw openings 189 and 190 extend in the same direction as screw 169 and stop member 168. In this condition corner 186 on block 165 is positioned with corner 188 on block 185. In this condition the first portion 193 of the pivot member resides in the elongated slot 187 and is held in position by the adjusting screws which reside in the openings 189 and 190. With the pivot member 192 positioning the rotor 172 in the exact central portion of the bore 166, the amount of lubricant forced from chamber 199 is the same as the amount of lubricant forced from chamber 200. If it is desired to change the volume of lubricant forced from chambers 199 and 200 then the rotor 172 must be shifted off of the exact center of the bore 166. For example, if it be desired that chambers 199 and 200 pump less lubricant then the pivot member 192 is shifted in slot 187 toward the opening 189 by loosening the adjusting screw therein and moving the adjusting screw in opening 190 further into slot 187. This moves the rotor toward the stop member which in turn is moved back into slot 167 by means of screw 169. This movement causes segments 175 and 177 to move further into the tapered slots. This cuts down the volume of chambers 199 and 200. Associating the structure shown in FIGURE 6 with that shown in FIGURE 3 a complete device made from the teachings of FIGURE 6 would involve the use of two blocks 165 and, of course, two blocks 185. The uppermost block 185 could be ported in a manner similar to spacer 138 shown in FIGURE 3 and the lowermost block 185 could be ported in a manner similar to the spacer plate 136. It would then only be necessary to provide a bottom section and top section such as those shown in FIGURE 3 and indicated by the reference numerals 139 and 140. A spacer plate like 137 would also be required.

The two blocks 165 which would be necessary would be ported in a manner similar to that shown in the porting of the intermediate blocks 83 and 84, respectively.

FIGURE 7 illustrates a construction of a feeder with an adjustable feature built in. This construction includes a block member 202 having a groove or slot 203 provided therein. A stop member 204 is formed as an integral part of the block member 202. First, second and third segments 205, 206 and 207 respectively, are disposed in the slot 203. The segments 205—207 are provided with pins 209, 210 and 211, respectively, which extend therefrom. A cooperating block member 213 is provided to cooperate with the block member 202 and is provided with first and second elongated slots 214 and 215, respectively. First and second openings 217 and 218, respectively, extend from either end of the elongated slot 214 and provide for the entrance of first and second adjusting screws. A spider 219 is provided which has slots 220, 221 and 222 therein. The spider is also provided with a pivot member 223. Pins 209, 210 and 211 in the assembled condition of the device reside in slots 220, 221 and 222, respectively. The portion of the spider within which the slots reside is housed within the elongated slot 215 in block 213 and a bearing member 224 resides within the elongated slot 214. The pivot member 223 of spider 219 resides within the bearing member 224 and turns therein. In the assembled condition corner 212 of block 202 corresponds with corner 216 of block 213. When the bearing member 224 is located in the exact center of the elongated slot 214 by means of the adjusting screws which reside in the openings 217 and 218, the pins 209, 210 and 211 have the same radius with respect to the pivot member 223. In this case, a certain volume of fluid is pumped from both chambers 225 and 226. If, for example, it be desired that this volume be reduced, it would be necessary to decrease the turning radius of pins 209 and 211. To accomplish this end, the bearing and the spider is caused to move toward the stop member 204 by loosening the adjusting screw contained within opening 217 and tightening or moving the adjusting screw within opening 218 so that it extends further into the elongated slot 214. By this means the amounts of fluid supplied by the respective chambers 225 and 226 can be varied by a simple adjustment which is accomplished by means of the adjusting screws contained within openings 217 and 218. The portion of the device shown in FIGURE 7 is substantially the same as that described in the discussion of FIGURES 6 and 3 to make a complete unit such as that shown in FIGURE 3. The same procedure may be gone through as described in making a complete feeder unit out of the construction shown in FIGURE 6. It is thus seen that a novel concept has been disclosed for producing a proportioning device which operates in a generally rotary direction and which may be easily adjusted to obtain varying volumes of material.

What is claimed is:

1. A device for driving fluid from a source including in combination a block having a fluid inlet and a plurality of fluid outlets, first and second circular bores in said block, a first and a second rotor each including a plurality of segments integral therewith and located in said first and second circular bores respectively, said segments defining a plurality of chambers, a first member extending across one of said chambers and engaging said first rotor, a second member extending across one of said chambers and engaging said second rotor, conduit means interconnecting said chambers of said first and second circular bores and said fluid inlet and outlets, fluid entering said chamber on one side of said member at a first end of said rotors moving said rotors from a first to a second position and fluid entering said chamber on the other side of said member at a second end of said rotors moving said rotors from said second to said first position, said first rotor in said first position directing fluid from said fluid inlet to said first end of said second rotor causing said second rotor to move from said first to said second position to eject fluid from said second end of said second rotor which fluid is directed back to said first rotor which in said first position directs said ejected fluid from one of said plurality of fluid outlets, said second rotor in said second position directing fluid from said fluid inlet to said first end of said first rotor causing said first rotor to move from said first to said second position to eject fluid from said second end of said first rotor which fluid is directed back to said second rotor which in said second position directs said ejected fluid from another one of said plurality of fluid outlets, said rotors being alternately actuated by fluid from said fluid inlet.

2. A device for dividing fluid from a source including in combination a block having a fluid inlet and a plurality of fluid outlets, first and second circular slots in said block defined by inner and outer wall means, a plurality of segments located in said first and second circular slots respectively, a stop member extending across each said slot, said segments, and said stop members defining a plurality of chambers, means securing said segments in each slot in spaced relation to each other, conduit means interconnecting said chambers of said first and second circular slots and said fluid inlet and outlets, fluid entering said slots on one side of said member moving said segments from a first to a second position and fluid entering said slots on the other side of said member moving said segments from said second to said first position, said first slot segments in said first position directing fluid from said fluid inlet to said first end of said second slot segments causing said second segments to move from said first to said second position to eject fluid from said second end of said second slot segments which fluid is directed back to said first slot segments which in said first position directs said ejected fluid from one of said plurality of fluid outlets, said second slot segments in said second position directing fluid from said fluid inlet to said first end of said first slot segments causing said first slot segments to move from said first to said second position to eject fluid from said second end of said first slot segments which fluid is directed back to said second slot segments which in said second position directs said ejected fluid from another one of said plurality of fluid outlets, said first and second slot segments being alternately actuated by fluid from said fluid inlet.

3. A device for dividing the flow of a fluid from a source including in combination first and second block members, each said block member comprising a circular bore in said respective block member, rotors in each bore, a stop member extending between each said rotor and the bore wall, first, second and third segments residing in each said circular bore and adapted for movement therein between first and second positions, said segments being integrally secured to respective rotors and at a fixed predetermined distance from each other, said segments and said stop members forming first, second, third and fourth chambers, first conduit means providing communication between a fluid source and said first chamber of each block member, second conduit means providing communication between said first chamber of said first block and said third chamber of said second block, third conduit means providing communication between said second chamber of said first block and said first chamber of said second block, fourth conduit means providing communication between said third chamber of said first block and said fourth chamber of said second block, fifth conduit means providing communication between said fourth chamber of said first block and said second chamber of said second block, sixth and seventh conduit means providing communication from said fourth chambers of said first and second blocks, respectively, to receiver means for said fluid when said first and second rotors are in said first position, eighth and ninth conduit means providing communication from said first chambers of said first and second blocks, respectively, to receiver means for said fluid when said first and second rotors are in said second position.

4. A device for dividing the flow of a fluid from a source including in combination first and second block members, each said block member comprising a circular bore in said respective block member, rotors in each bore, a stop member extending between each said rotor and the bore wall, first, second, third and fourth segments residing in each said circular bore and adapted for movement therein between first and second positions, said segments integrally secured to respective rotors and at a fixed predetermined distance from each other, said segments and said stop members forming first, second, third, fourth and fifth chambers, first conduit means providing communication between a fluid source and said first chamber of each block member, second conduit means providing communication between said first chamber of said first block and said fourth chamber of said second block, third conduit means providing communication between said second chamber of said first block and said third chamber of said second block, fourth conduit means providing communication between said third chamber of said first block and said first chamber of said second block, fifth conduit means providing communication between said fourth chamber of said first block and said second chamber of said second block, sixth and seventh conduit means providing communication from said second chambers of said first and second blocks, respectively, to receiver means for said fluid and eighth and ninth conduit means providing communication from said fifth chambers of said first and second blocks, respectively, to receiver means for said fluid.

5. Fluid dividing means comprising, block means having at least one fluid inlet and a plurality of fluid outlets, first and second annular chambers, ports in said annular chambers and passages interconnecting said ports and said inlet and outlet passages, a reciprocatory member in each annular chamber actuated by incoming fluid at one end of said annular chamber and ejecting a measured quantity of fluid from the opposite end of the annular chamber through a port and an interconnecting passage into the other annular chamber, said reciprocatory members being alternately actuated, each reciprocatory member when stationary constituting a valve cooperating with said ports and passages to control and direct both the admission and ejection of fluid to and from the other annular chamber and causing the fluid received from the opposite end of one annular chamber to be directly discharged out of an associated block means outlet passage under the inlet pressure, and means for adjusting said measured quantity of fluid which is ejected from said ends of said annular chamber.

6. A device for dividing fluid from a source including in combination block means having a fluid inlet means and a plurality of fluid outlets, first and second bores in said block means, rotors in said bores having central openings therein, a plurality of segments located in openings in said rotors and engaging said walls of said bores, a stop member extending across each bore into enaagement with a respective rotor, spring means urging said segments into engagement with said walls of said bores, pivot means extending into said central opening of each said rotor, said segments and said stop members defining a plurality of chambers, conduit means interconnecting said chambers of said first and second circular bores and said fluid inlet means and outlets, fluid entering said bores on one side of said member moving said segments from a first to a second position and fluid entering said bores on the other side of said member moving said segments from said second to said first position, said first bore segments in said first position directing fluid from said fluid inlet to said first end of said second bore segments causing said second segments to move from said first to said second position to eject fluid from said second end of said second bore segments which fluid is directed back to said first bore segments which in said first position directs said ejected fluid from one of said plurality of fluid outlets, said second bore segments in said second position directing fluid from said fluid inlet to said first end of said first bore segments causing said first bore segments to move from said first to said second position to eject fluid from said second end of said first bore segments which fluid is directed back to said second bore segments which in said second position directs said ejected fluid from another one of said plurality of fluid outlets, said first and second bore segments being alternately actuated by fluid from said fluid inlet, and means for shifting said pivot means.

7. A device for dividing fluid from a source including in combination block means having fluid inlet means and a plurality of fluid outlets, first and second circular slots in said block means defined by inner and outer wall means, a plurality of segments located in said first and second circular slots respectively, and having pins secured thereto, a stop member extending across each said slot, an annular plate associated with each said first and second circular slot and having spaced openings therein, and a pivot member, said openings in each said annular plate receiving one of said pins, bearing means for said pivot member of each said first and second annular plates, said segments and said stop members defining a plurality of chambers, conduit means interconnecting said chambers of said first and second circular slots and said fluid inlet means and outlets, fluid entering said slots on one side of said member moving said segments from a first to a second position and fluid entering said slots on the other side of said member moving said segments from said second to said first position, said first slot segments in said first position directing fluid from said fluid inlet to said first end of said second slot segments causing said second segments to move from said first to said second position to eject fluid from said second end of said second slot segments which fluid is directed back to said first slot segments which in said first position directs said ejected fluid from one of said plurality of fluid outlets, said second slot segments in said second position directing fluid from said fluid inlet to said first end of said first slot segments causing said first slot segments to move from said first to said second position to eject fluid from said second end of said first slot segments which fluid is directed back to said second slot segments which in said second position directs said ejected fluid from another one of said plurality of fluid outlets, said first and second slot segments being alternately actuated by fluid from said fluid inlet, and means for shifting said bearing means.

8. A device for dividing fluid from a source including in combination block means having fluid inlet means and a plurality of fluid outlets, first and second circular slots in said block means defined by inner and outer wall means, a plurality of segments located in said first and second slots, respectively, a stop member extending across each said slot, said segments being separated from each other to form chambers, ports in said chambers and passages interconnecting said ports and said fluid inlet means and fluid outlets, means operatively connecting said segments in each said circular slot together, said segments in each said circular slot being reciprocally actuated by incoming fluid at one side of said stop member and ejecting a measured quantity of fluid at the other side of said stop member through a port and an interconnecting passage into the other circular slot, said segments in one slot being alternately actuated, said segments in one slot when stationary constituting a valve cooperating with said ports and passages to control and direct both the admission and ejection of fluid to and from the other slot and causing the fluid received from one side of the stop member of one slot to be directly discharged out of an associated block means outlet passage under the inlet pressure, and means for shifting said bores in said bores to adjust said measured quantity of fluid which is ejected from said slots.

9. A device for dividing fluid from a source including in combination block means having fluid inlet means and the plurality of fluid outlets, first and second bores in said block means, a rotor in each of said bores, a plurality of segments located in openings in said rotor and engaging said walls of said bores and adapted for limited generally radial movement relative to said rotors, a stop member extending across each bore into engagement with a respective rotor, means urging said segments in said generally radial direction into engagement of said walls of said bores, said segments and said stop members defining a plurality of chambers, ports in said chambers and passages connecting said ports and said inlet means and outlet passages, said rotors being reciprocatorily actuated by incoming fluid at one side of said stop member of one bore and ejecting a measured quantity of fluid from the other side of said stop member through a port and an interconnecting passage into the other bore, said rotors being alternately actuated, each rotor and associated segments when stationary constituting a valve cooperating with said ports and passages to control and direct both the admission and ejection of fluid to and from the other bore and causing the fluid received from the other side of said stop member to be directly discharged out of an associated block means outlet passage under the inlet pressure, and means for shifting said rotors in said bores in a generally radial direction for adjusting said measured quantity of fluid which is ejected from said bores.

References Cited in the file of this patent
UNITED STATES PATENTS
1,234,392  Roberts _____ July 24, 1917